Donald W. Munger,
William C. McGaughey,
INVENTORS.

BY

ATTORNEY.

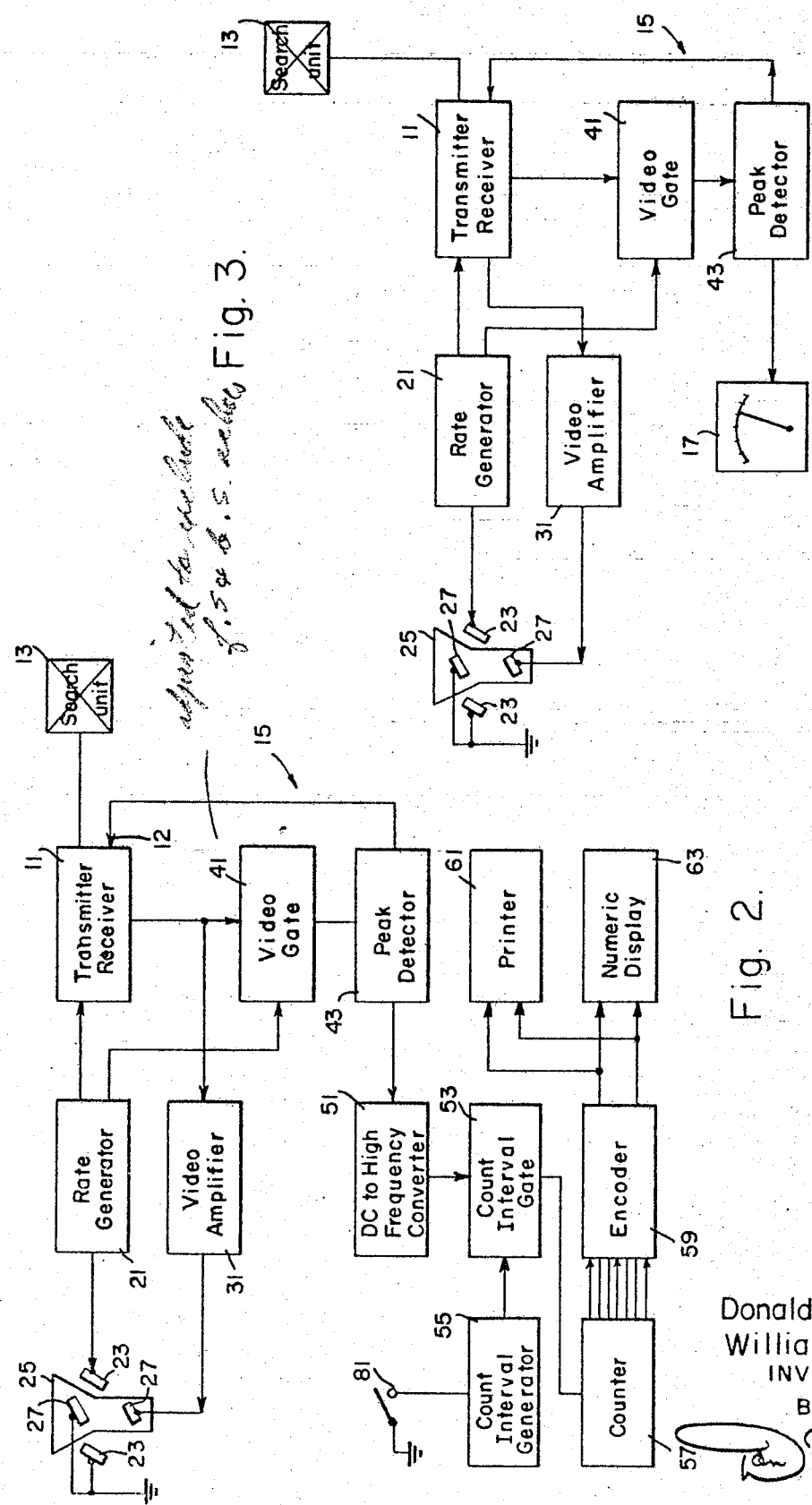

United States Patent Office 3,533,280
Patented Oct. 13, 1970

3,533,280
ULTRASONIC MATERIAL TESTER
William C. McGaughey, New Fairfield, and Donald W. Munger, New Milford, Conn., assignors to Automation Industries, Inc., El Segundo, Calif., a corporation of California
Filed Feb. 6, 1967, Ser. No. 614,082
Int. Cl. G01n 29/04
U.S. Cl. 73—67.9                                                13 Claims

ABSTRACT OF THE DISCLOSURE

Pulse echo ultrasonic testing apparatus wherein receiver gain is automatically adjusted to provide output signals normalized to a predetermined level. A peak detector responsive to the video signal provides a gain controlling voltage to the receiver. The peak detector voltage is also converted to a digital signal for numerical display and/or a printed record.

BACKGROUND OF THE INVENTION

This invention relates to ultrasonic inspection apparatus for inspecting workpieces by transmitting ultrasonic energy into the workpiece and receiving portions of the ultrasonic energy after it has traveled at least partially through the workpiece. More particularly it relates to locating acoustical discontinuities within the workpiece and accurately determining the nature and size of such a discontinuity.

DISCUSSION OF THE PRIOR ART

There are several different types of ultrasonic testing available. Normally ultrasonic energy is transmitted into a workpiece and portions of this energy received after traveling at least partially through the workpiece. In the so-called through transmission form of testing, the energy is normally transmitted into one side and received on the opposite side. If the workpiece is essentially homogenous the ultrasonic beam travels completely through the workpiece with a constant loss or attenuation. However, if there is a discontinuity within the workpiece, at least a portion of the energy is absorbed and/or reflected at the discontinuity. As a consequence the presence of a discontinuity can be determined by whether or not the energy passes through the workpiece. The amount of attenuation of the energy varies with certain characteristics, such as grain structures etc. within the workpiece. Accordingly by observing variations in the amount of attenuation it is possible to determine some of these characteristics of a workpiece.

In the so-called pulse-echo or reflective form of testing, ultrasonic energy is transmitted into the workpiece and echoes of this energy are received. By measuring the flight time of the energy, the range to the reflecting discontinuity or target can be determined. The amount of energy reflected from a target is a function of the size of the target. Accordingly by observing the magnitude or amount of reflected energy it is possible to determine the size of the reflecting interface.

It has been found when inspecting certain types of workpieces there are a large number of reflecting targets. Therefore, a large number of echoes may be received. Many of the echoes are reflected from discontinuities or targets that are not necessarily objectionable or at least do not warrant discarding the workpiece. For example, in the process of welding small air bubbles, porosity, inclusions etc. are frequently included in the final weldment. If these do not materially affect the strength of the weld the weld is considered of acceptable quality. Accordingly when ultrasonically inspecting a workpiece of this nature it has been necessary for the operator to distinguish between the echoes from acceptable targets and echoes from objectionable targets.

The amplitudes of the electrical signals produced from the echoes frequently vary over an extremely wide range. The response characteristics of ultrasonic test equipment is frequently not very linear, particularly over a wide range of signal amplitudes. One way of overcoming this difficulty is to employ a reference standard having a natural or artificial target corresponding to a target or defect of maximum acceptable size. This standard is then inspected and the equipment adjusted to normalize its response to some particular level such as half scale on a meter or oscilloscope. Thereafter, when inspecting a workpiece, any targets producing a lesser response are acceptable and those producing a greater response are objectionable.

In the event it is desired to accurately determine the exact size of the target, the operator may again manually normalize the equipment to produce a standardized response, such as a half-scale deflection. This secondary normalizing has been accomplished by manipulating a calibrated sensitivity control in the receiver amplifier section. This control varies the gain and is calibrated whereby the extent of the adjustment is an indication of the size of the target. This manual method of signal amplitude monitoring reduces errors from the operator reading the display system, nonlinearity errors etc. and it allows monitoring signals with wide dynamic ranges.

However this technique has several disadvantages. First of all it involves a time consuming manual manipulation of the sensitivity control. Secondly it is dependent upon an operator accurately interpreting the results. This produces significant and unpredictable errors, particularly if the operator is unskilled and/or tired. Accordingly, it may be seen although the prior art systems have been capable of locating and identifying certain types of defects they have not been entirely satisfactory for all types of applications, and particularly where it is desired to provide a high speed inspection that is accurate and free from operator error.

SUMMARY

The present invention provides means for overcoming the foregoing difficulties. More particularly the present invention provides an ultrasonic inspection apparatus capable of ultrasonically inspecting a workpiece at a high rate of speed and identifying different types of targets substantially free from any operator error or interpretation.

In the limited number of embodiments of the present invention disclosed herein this is accomplished by providing an ultrasonic transmitter and receiver for transmitting ultrasonic energy into a workpiece and receiving a portion of the energy after it has passed at least partially through the workpiece. The receiver includes means for generating an automatic gain control signal that is effective to automatically and continuously normalize the receiver. Output means are also provided which are responsive to the magnitude of the AGC signal and are effective to indicate the size of any discontinuities.

BRIEF DESCRIPTION OF THE DRAWINGS

The invention and specific embodiments thereof will be described hereinafter by way of example and with reference to the accompanying drawings wherein like reference numerals refer to like elements or parts and in which:

FIG. 2 is a block diagram of the ultrasonic testing apparatus of FIG. 1; and

FIG. 3 is a block diagram of another embodiment of the invention.

DETAILED DESCRIPTION OF THE DRAWINGS

Figure 1:
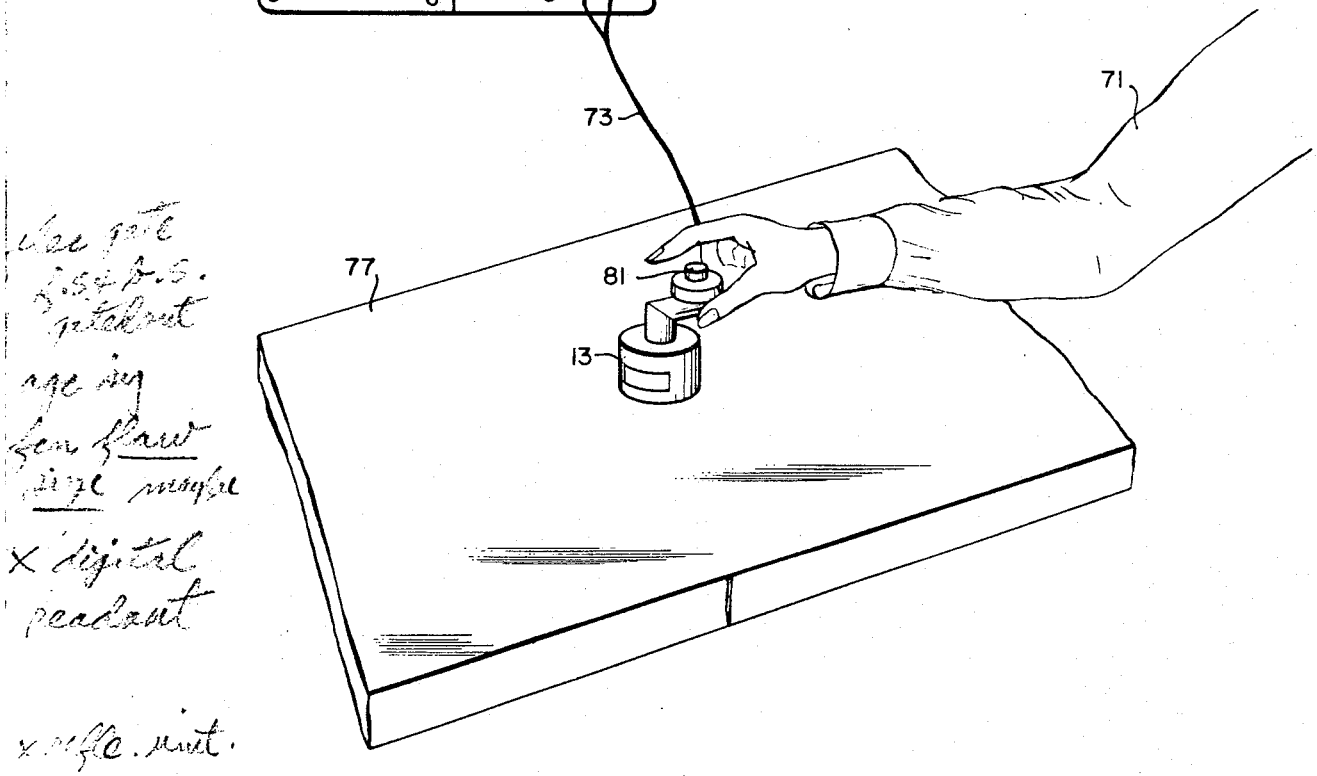
FIG. 1 is a view of an ultrasonic tester embodying one form of the present invention inspecting a workpiece.

With reference to the drawings and particularly FIGS. 1 and 2 there is shown an ultrasonic testing apparatus comprising an ultrasonic transmitter-receiver 11. If the apparatus is to operate in a pulse-echo mode a rate generator 21 may be provided for synchronizing and controlling the repetition rate. This generator 21 is normally a free running device which produces a train of essentially periodically occurring timing pulses. The rate generator 21 is coupled to the transmitter-receiver 11 and the timing pulses cause it to intermittently produce a drive signal. This drive signal is normally a short duration pulse of radio frequency.

The transmitter-receiver 11 is coupled to a search unit 13 by means of a transmission line such as a coaxial cable. The R.F. driving signals are coupled over this cable to the search unit 13 whereby the search unit 13 intermittently radiates pulses of ultrasonic energy. The search unit 13 is acoustically coupled to a workpiece 77 whereby the ultrasonic energy is propagated into the workpiece. At least a portion of the energy in the pulses is reflected from any discontinuities in the workpiece 77.

The search unit 13 senses any echoes of the ultrasonic energy reflected from the back side of the workpiece or any discontinuities therein. Each time the search unit 13 receives a pulse of ultrasonic energy, i.e. an echo of the original transmission, the search unit 13 produces an electrical signal corresponding thereto. The electrical signal is returned over the coaxial cable to the receiver portion of the transmitter-receiver 11. The receiver portion converts the received signal into a video signal which appears on the output. In addition the receiver portion includes amplifier means effective to increase the amplitude of the video signal to a more useful level. The relationship between the magnitude of the video signal from the transmitter-receiver 11 and the signal from the search unit 13 is a function of the gain of the amplifier portion. This gain is controlled by the magnitude of the signal on the control input 12.

Each time the search unit 13 transmits a pulse of ultrasonic energy, it receives a sequence of echo pulses. If the workpiece is free of any discontinuities at least one echo will be received from the reverse side of the workpiece. If the back side is parallel to the front side the first such echo will be strong and will be delayed from the transmitted pulse by an interval equal to the time for ultrasonic energy to propagate through the workpiece and return, i.e. the time delay is a function of the thickness of the workpiece.

If there are any discontinuities present, for example an inclusion or void, etc. at least a portion of the energy will be reflected therefrom and received by the search unit 13. The time delay between the resultant signal and the initial transmission is a function of the range to the discontinuity or target. The amplitudes of the echo and the resultant signal from the receiver are a function of the effective size of the discontinuity, i.e. a large target will produce a strong echo and a large signal whereas a small target will produce a weak echo and small signal. The variations in the amplitudes of these signals vary over an extremely large range. In many prior art devices the amplitudes of the signals are measured directly on a meter or oscilloscope. If the indicating means is operative over the entire range of the signals the sensitivity has inherently been very low. Thus significant changes in the signals have produced imperceptible changes in the display. As a consequence it has been extremely difficult, if not impossible, to accurately measure the amplitude of the signal or accurately determine the size of the target.

In order to provide a visual representation of the echo signals, a cathode ray tube 25 may be utilized. The rate generator 21 is effective to provide a time base sweep signal to the horizontal deflection plates 23. This is normally a saw tooth wave synchronized with the timing pulses coupled to the transmitter-receiver 11. The vertical deflection plates 27 are coupled to the transmitter-receiver 11 by a video amplifier 31. The video amplifier supplies vertical deflection signals corresponding to the returning echo signals. Accordingly an "A-scan" type of display is provided and by observing the horizontal displacement of the various indications the range to a reflecting surface can be determined. By observing the amplitudes of the indications the size of the reflecting surface may be determined. As explained above the amplitude of the indication varies over an extremely wide range. Accordingly, even though the gain may be so high that a maximum size reflector produces an indication beyond the limits of the tube 25, small but significant variations in the reflector size will not produce perceptible changes in the size of the indication.

Additional indicating means 15 may be provided which supplement the tube 25 and permit an accurate indication of the signal over the entire operating range. This indicator 15 includes means responsive to the signal and effective to produce a second signal corresponding thereto. Although any suitable means may be employed in the present instance, by way of example, a peak detector 43 is provided.

Such a detector 43 is effective to sense the maximum amplitude of an incoming signal such as the intermittently occurring pulse from the receiver 11. The detector 43 provides an essentially continuous or D.C. signal having an amplitude corresponding to the peak. In one form of this type detector a condenser is rapidly charged to the peak amplitude of any echo pulse occurring after a transmitted pulse. This charge is stored to produce the output signal. After the next pulse is transmitted the charge stored on the condenser is again revised to correspond to the amplitude of the next large echo pulse. It may be seen such a detector provides an essentially D.C. signal or, at least, a relatively slowly varying signal having an amplitude corresponding to the peak amplitude of the largest echo pulse.

Normally following each transmitted pulse a very large signal corresponding to the echo from the back surface of the workpiece is present. Since this echo pulse has the largest amplitude the peak detector 43 would naturally "lock onto" this signal and provide a D.C. signal having an amplitude corresponding to the strong backside echoes. Under some circumstances the primary interest may be the nature of the reverse or back surface and accordingly, such a signal will be of interest.

However, if it is desired to locate discontinuities in the center portion of the workpiece it is desirable to provide a device such as a gate 41 for rejecting the signals corresponding to the back surface. This gate 41 is coupled to the rate generator 21 whereby its operation is synchronized with the transmission of the ultrasonic energy and the reception of the returning echoes. The gate 41 is normally closed and prevents the passage of any signals. However, following each transmission the gate 41 opens for a gating interval corresponding to the time during which echoes are received from the zone of interest, i.e. the volume between the front surface and the back surface. It may thus be seen the output from the peak detector 43 will be a D.C. or slowly varying signal corresponding to the size of any reflecting targets located between the front and back surfaces.

This signal may be directly employed to indicate the size of the reflecting surface. However, it has been found the accuracy of the system may be greatly improved if a signal from the peak detector 43 is coupled back to the control input 12 on the transmitter-receiver 11. This forms a closed-loop feedback circuit that functions as an AGC or automatic gain control. The gain of the amplifier in the receiver 11 will be varied to normalize the signals therefrom to a preselected range. As a consequence the amplifier etc. will be processing signals of constant amplitudes and accordingly will always be operating with linear characteristics.

The amplitude of the signal from the peak detector 43 and therefore, the size of the reflecting target may be indicated by any suitable means. In addition, though, the present invention may include a digitalized or numerical readout. This readout includes a D.C. to A.C. converter 51, a count interval gate 52 and a counter 57. The converter 51 is effective to convert the D.C. or slowly varying signal from the detector 43 into an FM signal. The instantaneous frequency of this FM signal corresponds to the amplitude of the signal from the detector 43 and, therefore, the size of the reflecting target.

A gate control 55 may be coupled to a gate 53 coupled between the converter 51 and a counter 57 for opening and closing the gate at predetermined times. This control 55 may be a device such as a multivibrator which produces one or more squarewave pulses whenever the control 81 is actuated. These pulses open the gate 52 and allow the FM signal to pass therethrough for a precisely regulated gating or counting interval. As a consequence the number of cycles of the FM signal occurring during this interval will be a function of the size of the reflecting target.

The counter 57 counts the number of cycles of the FM signal occurring during each gate interval and produces a digitalized signal on the parallel outputs. These outputs are coupled to an encoder 59 which is coupled to a printer 61 and/or numeric display 63. The printer 61 is effective to print a permanent record on a strip of paper. The numeric display 63 includes a plurality of devices, such as glow tubes, for producing a temporary visual display of the size of the reflecting surface.

Before utilizing the present invention for inspecting a workpiece 77, the gate 41 is first adjusted to exclude signals corresponding to the front and back surfaces etc. and to pass only those signals corresponding to discontinuities therebetween. Following this the search unit 13 may be placed on a standard or reference block having a target of known size. This target normally corresponds to a target of maximum acceptable size. The system is then manually adjusted to produce a zero reading on the indicator 63 and printer 61.

Following this an operator 71 manipulates the search unit 13 across the surface of a workpiece 77 until a discontinuity or reflecting surface is noted by the variations in the display on the cathode ray tube 25. For example, if it is desired to inspect a weld the search unit 13 may be manipulated along the surface of the weldment until a target such as an inclusion, void etc. is acquired.

The video gate 41 receives the signal from the receiver 11 and gates it. Only pulse signals corresponding to a centrally located target are fed to the peak detector 43. All signals corresponding to the back surface, etc. are rejected. The detector 43 converts such pulse signals into an AGC signal having an amplitude corresponding to the largest signal during the gating interval. This signal will correspond to the largest discontinuity present.

The AGC signal is used to control the gain of the receiver 11 and thus automatically normalize the system so that it is operating in a linear range. At the same time the direct current AGC signal is converted by the converter 51 into an FM signal. The instantaneous frequency of this FM signal is dependent upon the amplitude of the AGC signal at that particular instant. It is, therefore, a function of the effective size of the target displayed on the oscilloscope.

After the operator has located a target as indicated on the oscilloscope 25 the operator may determine the effective size of the target by depressing the control button 81. This activates the count interval generator 55 whereby the gate 53 is opened for the count intervals and the FM signal is coupled to the counter 57. The number of cycles in the FM signal are counted and the encoder is effective to actuate the printer 61 and/or numeric display 63 whereby the operator can readily determine the effective size of the target.

When testing certain types of materials, such as a butt weld, there are a large number of reflecting targets which are not of sufficient magnitude to warrant rejecting the workpiece. Accordingly, it is desirable for the operator to be able to readily distinguish between targets of sufficient magnitude to warrant rejecting the workpiece and those that are of a minor nature. The simplest way of doing this is to set the numeric display 63 at zero when the search unit 13 is coupled to a standard or reference block having a maximum acceptable target therein. If the target in the workpiece is less than this size a negative indication will be produced on the display 63. The operator will thereby readily know that the workpiece is not sufficiently defective to warrant rejecting it. At the same time, a permanent record will be printed to confirm this fact. However, if the target is of excessive size the indication on the display 63 will be a positive signal whereby the operator rapidly realizes this factor. A permanent record will be produced which will substantiate rejecting the workpiece.

It can be appreciated the signals produced in the transmitter-receiver 11 normally vary over extremely wide ranges. However, the AGC signal will vary over a considerably smaller range. It has also been found that the AGC signal is naturally "compressed." When the echo signal from the receiver 11 is at or near the normalized level relatively small changes in the echo signal cause relatively large changes in the AGC signal. Thus, in the critical borderline region where the display 63 produces a zero or near zero reading (i.e. the target is just of questionable acceptability) the system will be extremely sensitive and a relatively small difference in target sizes will be indicated by relatively large signal changes. However, when the echo signal is substantially different from the normalized value and a critical situation is not present, relatively large changes in the echo signal produce relatively small changes in the AGC signal. Accordingly, the system is very sensitive in the critical regions but can still indicate changes over a wide range. It has been found desirable to construct the system whereby the display indicates in decibels from the normalized signal.

As an alternative the embodiment of FIG. 3 may be employed. This system is very similar to the preceding one in that a transmitter-receiver 11 is energized by a rate generator so as to intermittently energize the search unit 13 and produce corresponding signals. The received signals are, in turn, coupled through a video amplifier 31 to one set of deflecting plates in an oscilloscope 25. The other set of deflecting plates 23 are triggered by the rate generator 21 so as to produce a visual display.

In addition the receiver is coupled to a video gate 41 which is opened intermittently in synchronism with the reception with the echo signals. The gated video signals are in turn coupled to a peak detector 43. This detector 43 is effective to produce an AGC signal which controls the gain of the receiver 11 so as to maintain a substantially constant output signal.

In addition the AGC signal is coupled to an indicating meter 17. This meter 17 is effective to indicate the magnitude of the AGC signal and, therefore, the size of the target. In order to provide an easy means of accepting or rejecting the workpiece, a suitable reference marking may be provided on the meter to indicate the borderline. It can be appreciated this arrangement is not as precise as the first embodiment, nor does it have as wide a dynamic range. However, it is considerably cheaper and simpler to operate.

While only a limited number of embodiments are disclosed herein it will be readily apparent to persons skilled in the art numerous changes and modifications may be made thereto, without departing from the spirit of the

What is claimed is:
1. An ultrasonic testing apparatus, comprising
   transmitting means for transmitting ultrasonic energy into a workpiece to be tested,
   receiving means adapted to be coupled to said workpiece for receiving said ultrasonic energy and for providing an echo signal representative of a discontinuity in said workpiece,
   sensing means coupled to said receiving means for detecting said echo signal and for providing an automatic gain control signal to control the gain and normalize the response of said receiving means to a predetermined level, and
   utilization means coupled to said sensing means and responsive to the automatic gain control signal for providing an output indicative of the characteristics of said detected flaw in said workpiece.

2. An ultrasonic testing apparatus, comprising
   transmitter-receiver means for transmitting ultrasonic energy into a workpiece and receiving ultrasonic energy and for providing an echo signal representative of a target in said workpiece,
   sensing means coupled to said receiving means for detecting said echo signal and for providing an automatic gain control signal to control the gain and normalize the response of said receiving means to a predetermined level, and
   utilization means coupled to said sensing means and responsive to the automatic gain control signal for providing an output indicative of the characteristics of said target in said workpiece.

3. An ultrasonic testing apparatus as claimed in claim 2, wherein
   said transmitter-receiver means sends and receives in timed sequence ultrasonic energy into and from said workpiece through a single search unit.

4. An ultrasonic testing apparatus comprising
   transmitting means for transmitting ultrasonic energy into a workpiece,
   receiving means coupled to said workpiece for receiving the ultrasonic energy and for providing an echo signal representative of a target in said workpiece,
   echo signal gating means coupled to said receiver and having a gating interval corresponding to a predetermined timed portion of the echo signal, said gate being effective to pass the portion of said echo signal occurring during the gating interval,
   peak detector means coupled to said echo signal gating means for detecting the gated echo signal and for providing an automatic gain control signal to control the gain and normalize the response of said receiving means to a predetermined level, and
   utilization means coupled to said peak detector and responsive to the automatic gain control signal for providing an output indicative of the characteristics of said target in said workpiece.

5. An ultrasonic testing apparatus as claimed in claim 4, wherein
   said apparatus also comprises display means coupled to said receiving means and responsive to the normalized echo signal thereof for providing a visual display of said video signal.

6. An ultrasonic testing apparatus as claimed in claim 5, wherein
   said display means includes a cathode ray display tube having two sets of deflection means, a rate generator coupled to and triggering said transmitting means and coupled to and providing time base signals for said video gating means and one set of deflection means, and a video amplifier coupled to said receiving means and to said other set of deflection means for amplifying said video signal and applying the amplified signal to said other set of deflection means.

7. An ultrasonic testing apparatus, comprising
   transmitting means for transmitting ultrasonic energy into a workpiece,
   receiving means coupled to said workpiece for receiving the ultrasonic energy and for providing an echo signal representative of a target in the workpiece,
   sensing means coupled to said receiving means for detecting said echo signal and for providing an automatic gain control signal to control the gain and normalize the response of said receiving means, and
   utilization means including interval timing and counter means coupled to said sensing means and responsive to the automatic gain control signal for providing a digital printer and numeric display.

8. An ultrasonic testing apparatus, comprising
   transmitting means for transmitting ultrasonic energy into a workpiece,
   receiving means coupled to said workpiece for receiving said ultrasonic energy and for providing echo signal representative of a detected flaw in the workpiece,
   gating means coupled to said receiver and responsive to the echo signal for gating the echo signal by providing as an output only a predetermined timed portion thereof,
   peak detector means coupled to said gating means for detecting the gated echo signal and for providing an automatic gain control signal to control the gain and normalize the response of said receiving means to a predetermined level, and
   utilization means being responsive to the automatic gain control signal and comprising a D.C. to high frequency converter, a count interval generator, a numeric encoder, a count interval gate connected to the outputs of said converter and said generator, a frequency counter connected to the output of said gate and to the input of said encoder, and a numeric printer and parallel connected numeric display connected to the output of said encoder.

9. An ultrasonic testing apparatus as claimed in claim 8, wherein
   a remote read button is connected to and triggers said count interval generator when actuated.

10. An ultrasonic testing apparatus, comprising
    transmitting means including an ultrasonic transducing search unit for transmitting ultrasonic energy into a workpiece,
    receiving means coupled to said workpiece through said search unit for receiving said ultrasonic energy and for providing an echo signal representative of a target in the workpiece,
    gating means coupled to said receiver means and responsive to the echo signal for gating the echo signal by providing as an output only a predetermined timed portion thereof,
    peak detector means coupled to said gating means for detecting the peak voltage of the echo signal and for providing an automatic gain control signal to control the gain and normalize the response of said receiving means to a predetermined level, and
    utilization means responsive to the automatic gain control signal and comprising a D.C. to high frequency converter, a count interval generator, a numeric encoder, a count interval gate connected to the outputs of said converter and said generator, a frequency counter connected to the output of said gate and to the input of said encoder, and a numeric printer and parallel connected numeric display connected to the output of said encoder.

11. An ultrasonic testing apparatus as claimed in claim 10, including
    a remote read switch which is connected to and triggers said count interval generator.

12. An ultrasonic testing apparatus, comprising transmitting means including an ultrasonic search unit for transmitting an ultrasonic detecting signal into a workpiece, receiving means coupled to said workpiece through said search unit for receiving said ultrasonic energy and providing an echo signal representative of a target in said workpiece, gating means coupled to said receiver and responsive to the echo signal for gating the echo signal by providing as an output only a predetermined time portion thereof, peak detector means coupled to said gating means for detecting the peak voltage of the echo signal and for providing an automatic gain control signal to control the gain and normalize the response of said receiving means to a predetermined level, display means coupled to said receiving means and responsive to the normalized echo signal thereof for providing a visual display thereof, said display means including a cathode ray display tube having horizontal and vertical deflection electrodes, a rate generator coupled to and triggering said transmitter and receiver means and coupled to and providing time base signals for said gating means and said horizontal deflection electrodes, and an amplifier coupled to said receiving means and to said vertical deflection electrodes for amplifying the echo flaw signal and applying the amplified signal to said vertical deflection electrodes, and utilization means being responsive to the automatic gain control signal and comprising a D.C. to high frequency converter, a counter interval generator, a numeric encoder, a count interval gate connected to the outputs of said converter and said generator, a frequency counter connected to the output of said gate and to the input of said encoder, and a numeric printer and parallel connected numeric display connected to the output of said encoder.

13. An ultrasonic testing apparatus as claimed in claim 12, wherein a remote read switch is connected to and triggers said count interval generator when actuated.

References Cited
UNITED STATES PATENTS

| 3,041,872 | 7/1962 | Brown et al. | 73—67.9 |
| 3,274,821 | 9/1966 | Weighart | 73—67.8 |
| 3,372,576 | 3/1968 | Dory | 73—67.9 |

OTHER REFERENCES

Goldman, Ultrasonic Technology, pp. 263–267; Reinhold Pub. Co. 1962.

JAMES J. GILL, Primary Examiner